United States Patent [19]

Callut et al.

[11] Patent Number: 4,690,914

[45] Date of Patent: Sep. 1, 1987

[54] PROCESS FOR THE PREPARATION OF AN ABSORBING AND ADSORBING AGENT; AND THE PRODUCT PRODUCED THEREFROM

[75] Inventors: Francois Callut, Marcinelle-Bruyeres; Daniel Demeuldre, Hyon-Mons, both of Belgium

[73] Assignee: Marginvest S.A. Holding, Luxembourg

[21] Appl. No.: 843,742

[22] Filed: Mar. 25, 1986

Related U.S. Application Data

[63] Continuation-in-part of Ser. No. 742,201, Jun. 7, 1985, abandoned.

[30] Foreign Application Priority Data

Jun. 7, 1984 [BE] Belgium ................................. 213086

[51] Int. Cl.$^4$ ............................................. B01J 20/00
[52] U.S. Cl. ..................................... 502/400; 502/416
[58] Field of Search ............... 502/427, 436, 437, 421, 502/416, 400; 264/29.1, 29.6, 29.7

[56] References Cited

U.S. PATENT DOCUMENTS

| | | | |
|---|---|---|---|
| 1,250,228 | 12/1917 | Rule et al. | 502/427 |
| 2,461,365 | 2/1949 | Bennett et al. | 264/29.6 |
| 3,009,863 | 11/1961 | Angevine | 264/29.7 |
| 4,139,416 | 2/1979 | Palumbo et al. | 502/421 |
| 4,202,868 | 5/1980 | Hayashi et al. | 423/445 |
| 4,526,887 | 7/1985 | Sutt | 502/437 |
| 4,540,678 | 9/1985 | Sutt | 502/437 |

*Primary Examiner*—Curtis R. Davis
*Attorney, Agent, or Firm*—Fishman & Dionne

[57] ABSTRACT

A process for the preparation of noncarcinogenic, chemically inactive absorbing and adsorbing agents is presented and comprises, in part, treatment of a combustible material by pyrolisis for several hours and a subsequent stage of fritting or sintering at a high temperature. This fritting or sintering step permits the resultant product to acquire the required physical and chemical properties, especially a sufficiently high mechanical strength. This invention also includes the product produced from this process.

24 Claims, No Drawings

PROCESS FOR THE PREPARATION OF AN ABSORBING AND ADSORBING AGENT; AND THE PRODUCT PRODUCED THEREFROM

BACKGROUND OF THE INVENTION

This invention generally relates to a process for the preparation of an absorbing and adsorbing agent which is noncarcinogenic and chemically inactive; and the absorbing and adsorbing agents which are produced therefrom.

Presently, commercially available absorbing and adsorbing agents are known which have crystallographic structures which are related to the structure of asbestos. As a result of this similarity to asbestos, conventional absorbing and adsorbing agents run a relatively high risk of being carcinogenic, chemically active and pathogenic.

Accordingly, it is an object of the present invention to provide new absorbing and adsorbing agents which are chemically inactive, noncarcinogenic and nonpathogenic.

It is another object of the present invention to prepare new absorbing and adsorbing agents in accordance with a novel process wherein it is possible to achieve energy savings relative to prior art processes for preparing absorbing and adsorbing agents.

SUMMARY OF THE INVENTION

The above discussed and other problems of the prior art are overcome or alleviated by the process and product derived therefrom of the present invention. In accordance with the present invention, a process for the preparation of noncarcinogenic, chemically inactive absorbing and adsorbing agents is provided and comprises, in part, treatment of a combustible material by pyrolysis for several hours and a subsequent stage of fritting or sintering at a high temperature. This fritting or sintering step permits the resultant product to acquire the required physical and chemical properties, especially a sufficiently high mechanical strength.

The above discussed and other advantages of the present invention will be apparent to and understood by those skilled in the art from the following detailed description.

DESCRIPTION OF THE PREFERRED EMBODIMENT

IN accordance with the present invention, a process for the preparation of a noncarcinogenic, and chemically inactive absorbing and adsorbing agent and the product derived therefrom is presented. The absorbing and adsorbing agent is prepared from a combustible material, preferably selected from the group consisting of coal derivatives and in particular, coal slurries having the following characteristics on a dry basis (rough dried):

(1) fuel content 10 to 50%;
(2) calcined residue 90 to 50%; and
(3) moisture 15 to 60%.

The fuel content may consist of (1) coal schists which have undergone a relatively thorough crushing or grinding treatment so as to produce the required absorption value; or (2) bituminous schist; or (3) clays mixed with a fuel such as coal, coal slurry, wood, organic residues from domestic or other refuse, and the like.

Generally, the combustible material described above is recovered in the form of a mud containing carbon or organic matter with a relatively high content of water and of inorganic matter. These combustible materials are generally recovered by re-exploitation of dumps, coal washing and bottom-dredging products from rivers or canals. Because of the high moisture, mud form of the combustible materials, these materials do not readily lend themselves for use in recovery of their calorific value and, assuming combustion thereof is possible at all, they generally produce a large quantity of unusable ash.

In accordance with the present invention, such combustible materials which have generally been overlooked as sources of absorbing and adsorbing agents, are in fact used to prepare the absorbing and adsorbing agent. Moreover, the by-products and other residues produced in accordance with the process of the present invention may also be used in other applications.

Under certain conditions, it may be necessary to combine selected additive materials with the above mentioned combustible base materials. For example, such additives may be selected from the groups consisting of clay, fly-ash, ash, calcination residues and distillation residues. In particular, if bituminous schists are used as the starting combustible material, the additives may include lime, calcium or magnesium or another carbonate material, and magnesia, either alone or in combination with one of the above materials. It will be appreciated that such additive materials will provide an absorbing and adsorbing product of reduced cost by controlling the degree of absorption or adsorption in a known manner.

The process of the present invention for the preparation of a noncarcinogenic, chemically inactive, mechanically strong nonpathogenic absorbing and adsorbing agent includes the steps of, treating a combustible material (such as the materials described above) by pyrolysis for several hours and; subsequently fritting or sintering the combustible material at a high temperature. In a preferred embodiment, prior to the pyrolysis heat treatment, the combustible materials as defined hereinabove, are shaped so that no internal point in the material is more than 10 mm, and preferably more than 8 mm from the surface thereof. Such a shaping treatment can be easily accomplished with, for example, the aid of an extrusion machine, the material then being chopped if necessary. Consequently, if the starting combustible material is difficult to handle due to its sticky, viscous and wet nature, the preliminary shaping step described directly above will allow better handling.

It will be appreciated that the pyrolysis and fritting heat treatments may be carried out in a horizontal oven of the brickworks oven type, or in a vertical reactor of the gas generator type. Preferably, the pyrolysis step is conducted at a temperature between about 350° to about 900° C. and more preferably between about 500° to 800° C., a preferred approximate temperature being about 700° C. The temperature of the fritting or sintering step is conducted at a higher temperature relative to the pyrolysis step temperature and is preferably above 900° C., most preferably being in the region of about 950° C.

In accordance with an alternative embodiment of the process of the present invention, fluxes may be added which lower the process threshold for the fritting operation, the fritting temperature being lowered below 900° C.

In accordance with another preferred embodiment of the process of the present invention, the gaseous by-products produced during the pyrolysis step are recovered and subsequently either wholly or partially used to provide energy for continuing the pyrolysis treatment. Of course, the use of the gaseous by-products would begin following the start-up phase (wherein an additional fuel would be used to initially heat the combustible material). Also, further features of the process of the present invention comprise:

(1) The preferable use of a portion of the energy potential of the combustible fuel included in the initial bulk material being processed; and (2) The recovery of the excess heat inherent in the gases produced during the pyrolysis step, which serve as additional heat for various processes. For example, these processes may include combustion in a boiler, the production of heating gas and over-heating gas, and the like. Also, the latent heat of the gases produced during the pyrolysis step and from the absorbing product are also recovered during the process of the present invention.

Subsequent to the sintering or fritting step of the process of the present invention, various other treatments of the product may be utilized such as crushing, screening, dust removal, conditioning (particularly for conveyance in bulk or other means); or other treatments with regard to the product usage, for example, spreading, guniting, and the like.

Certain industrial activities, particularly the automobile industry, produce by-products which are combustible, but which are toxic or hazardous to destroy via combustion. The process of the present invention enables such by-product material to be safely destroyed at an efficient cost and with practical utilization of the final product (i.e., as an absorbing and adsorbing agent). In accordance with the present invention, it is possible to mix such toxic or hazardous products with an inert bulk material which may be natural clay, calcined or ceramic clay, which may or may not originate from the process of the present invention; but contains sufficient moisture to be capable of being shaped, particularly with the aid of an extruder. Following such shaping, the shaped material undergoes the heat treatment process steps (pyrolysis and sintering) of the present invention. During such heat treatment steps, the toxic or hazardous mixture undergoes cracking which converts the same into nontoxic, useful combustible gaseous components such as $CO$, $H^2$ and $CH^4$. It may also be advantageous to add to the toxic or hazardous bulk material described above certain additives including lime (in the form of an oxide), hydroxide or carbonate and other products which permit gases to be fixed such as, for example, magnesia. In this way, the sulphur oxides and nitrogen oxides produced during the combustion of the bulk material may be fixed in the form of sulphates and nitrates.

The pyrolysis is present whenever a fuel is brought into combustion. When this pyrolysis emission is accomplished in a gas-producer, a combustible gas is produced. It begins, conventionally, above 105° C. and is very active at 405° C. The sintering is preferably carried out on all the alumino-silicates at about 900° C., and may reach 1400°–1500° C. for refractory alumino-silicates. It is possible to lower the sintering temperature under 900° C. by admixing fluxes (iron oxide, borax, etc.).

The atmosphere is always a reducing atmosphere in that part of the process wherein the pyrolysis is carried out. If desired, an oxydizing atmosphere may be used after pyrolysis, to oxidize the metals (particularly iron) in order to obtain a rosy or a red color. Where adsorption is preferred to absorption, the pyrolysis is ended by a relatively quick extraction, what is easily done in a gas-producer or in a brick-works-oven (acceleration of the extraction). All these operations are preferably carried out with a slightly reduced pressure in the production tools (for safety sake) because the pyrolysis emits dangerous and toxic gases which could escape if, under pressure, the tools in use would present a tightness-defect.

As mentioned hereinabove, the present invention also comprises the absorbing and adsorbing product which is produced by the process described above. It should be understood that an important feature of the absorbing and adsorbing product produced in accordance with the present invention is that it exhibits non-deliquescent behavior during absorption or adsorption. It should also be understood that the combustion of the combustible substances within the overall bulk material being converted in accordance with the present invention contributes to the thermal heating of the latter. The contribution of the heat derived from the combustion of the combustible segment of the bulk material comprises an important feature of the process of the present invention.

Significantly, the present invention provides a needed use for combustible materials of low fuel content, i.e., 10–50% by weight (which are generally discarded), for the production of adsorbents or absorbents which can be used as bedding for domestic animals; for the adsorption by sweeping of the hydrocarbon products accidentally spilled onto the floors of workshops, garages or workrooms; for packing of fats or oily materials; for workrooms in the motorcar industry and many other applications.

It will be appreciated that manufacturers are always interested in the search for economical processes which are able to give an increase in value to cheap products, particularly when these cheap products, as up to now, have to be discarded. This is precisely the case with the raw materials (i.e., low fuel content combustible materials) used in the present invention.

In the process of the present invention, the starting materials are not the expensive materials commonly used in the prior art, (i.e., high quality coal: 80–90%C, anthracite: 95%C, high ranking bituminous coals, cokes, pitch coke, etc.), but consist of coal residues resulting from industrial processes, or wood. Examples are the coal slurries which are poor in carbon and obtained in the washing of coals; the coat schists or bituminous schists (which are of little interest in industry); the bio-masses which can be polluted; the residues from the cleaning of shipholds which have been used for the transfer of solid, liquid or pasty fuels, etc. As mentioned, at times, these poor combustible materials must be combined with selected additive materials of low value, mainly clay, or fly-ash, ash, calcination residues and distillation residues. In most processes described in the prior art, thermal energy produced exterior of the process is necessary. In the present invention, except for the starting operation, the process is thermally autogeneous in this sense that the combustion is effected on the mixture of fillers and "fuel", with or without inert materials, which have received a convenient and inexpensive mechanical preparation (i.e., pellets having a maximum diameter of 18 mm).

The process of the present invention can be carried out in existing installations such as gas-producers or in two brickworks-ovens operating in parallel (one for the drying, the calcination, the pyrolysis and the sinterization, and the other one for the recovery of the pyrolysis gas which is used directly, without any other heat addition, for the baking of clay bricks). In the second oven, it is also possible to effect other industrial operations, such as activation of coal, drying of ceramics, drying of a glaze on ceramics, baking of ceramics, etc. Other kilns, such as vertical lime-kilns or cement-kilns or a single brickworks-oven can be used, but in this case, it is not possible to recover the pyrolysis gas unless by treatment of the smoke.

The operation of the present invention is thus extremely simple and does not necessitate a special description since the installations exist and need only to be controlled. Nevertheless, up to now, such an operation for such a purpose has never been described or considered as practicable. For instance, the manufacturers of gas-producers deem that it is impossible to gasify combustible materials which have an inert content (ash) above 55% on a dry basis. However, according to the present invention, a gas-producer gasifies products containing 85% of ash, which simultaneously provides a combustible gas and an excess of steam used in the process (see Example 2).

The present invention will be further described with the aid of the following illustrative examples:

EXAMPLE 1

In an industrial facility comprising two brickworks ovens, a first oven is fed (after ignition) continuously, at a rate of several t/h, with a slurry having the following characteristics (on a dry basis):

fuel content: 25 to 35%
calcined residue: 75 to 65%
moisture: 20 to 25%

This slurry, originating from reprocessing of dumps (slag heaps), has been passed through an extruder prior to heating in the oven and is in the form of columns 18 mm in diameter.

The columns, chopped into lengths of about 2 to 3 cm are charged onto stacked trays in the oven and, in a first step, undergo a pyrolysis operation at a temperature in the region of about 700° C.

The pyrolysis and subsequent fritting reaction is maintained by the inherent calorific value of the combustible material employed; and also produces a hot and combustible gas which is used directly, without other heat addition, to operate a second oven in which clay bricks intended for construction are produced at a rate of several t/h, (which are equivalent in weight to the tonnage of the slurry introduced into the first oven).

The material obtained at the outlet of the oven is wholly inorganic to the core (without black traces of carbon-containing matter), which may be ground and which, after adding fines, may be employed as bedding for domestic animals.

EXAMPLE 2

The columns chopped in accordance with Example 1 are charged into a prototype gas-producer rated at 2000 kw of heat as gas containing air, a few meters in height and with a diameter of one-fourth of the height; 130 centimeters in the present case. After ignition, the functioning of the gas producer is adjusted by controlling the temperature in the region of 900° to 1000° C. using conventional means: air draught or pressure, steam addition, carbon dioxide injection, etc.

The gas produced is collected and may be employed to drive a gas engine, a boiler, or the like.

The thermal efficiency, based on the calorific content of the starting materials, is on the order of 85%.

It will be appreciated that dry basis indicates the portion of dry fuel in the total amount of dry mixture or indicates the portion of inert material in the total amount of dry mixture. On the other hand, the starting materials consisting of coal slurries can have a moisture content of from 15 to 60%. This moisture, if too high, an be lowered by a natural drying or by mixing with drier materials.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process for the preparation of a noncarcinogenic, chemically inactive and mechanically strong material for use as an absorbing and adsorbing agent including the steps of:
    treating a combustible material having a low fuel content of equal to or less than about 50% carbon and selected from the group comprising coal schists, bituminous schists or clays mixed with a fuel such as coal, coal slurry, wood, or organic residues from domestic or other refuse, by pyrolysis at a first temperature between about 350° to about 900° C. for at least two hours under a slightly reduced pressure in a reducing atmosphere wherein gaseous by-products are produced during said pyrolysis treatment;
    subsequently sintering said combustible material at a second temperature, said second temperature being higher than said first temperature to produce an absorbing and adsorbing product, said product having no more than trace amounts of carbon therein;
    recovering at least a portion of said gaseous by-products; and
    using said recovered by-products to provide continued energy to effect said pyrolysis treatment or to provide energy for at least another different activity.

2. The process of claim 1 wherein said combustible material is a coal slurry having the following composition (on a dry basis):
    (a) fuel content (on a dry basis) of from about 10 to about 50%;
    (b) calcined residue (on a dry basis) of from about 90 to about 50%; and
    (c) moisture of from about 15 to about 60%.

3. The process of claim 1 including the step of:
    adding an additive material to said combustible material in the proportion of 65% to about 80% by weight (on a dry basis), said additive material being selected from the group comprising clay, flyash, ash, calcination residues, distillation residues, lime, calcium or magnesium or another carbonate material, or magnesia, either alone or in combination with one of the other additive materials.

4. The process of claim 1 including the step of:
    shaping said combustible material prior to said pyrolysis treatment.

5. The process of claim 4 wherein said shaping step includes:
shaping said combustible material so that no internal point in the shaped material is more than about 8 millimeters from the surface thereof.

6. The process of claim 4 wherein said shaping step comprises:
extruding said combustible material.

7. The process of claim 4 including the step of:
chopping said shaped combustible material.

8. The process of claim 1 wherein said second temperature is above 900° C.

9. The process of claim 1 including the further step of:
adding fluxes to said combustible material whereby the sintering second temperature may be reduced.

10. The process of claim 9 wherein:
said fluxes are added in the proportion of about 7% to about 15% by weight (on a dry basis) to said combustible material.

11. The process of claim 1 and including the further steps of:
recovering the latent heat of said gaseous by-products; and
recovering the latent heat of said absorbing and adsorbing product.

12. The process of claim 1 including the step of:
providing an oxidizing atmosphere subsequent to said pyrolysis whereby said absorbing or adsorbing product has a rosy or a red color.

13. A noncarcinogenic, chemically inactive and mechanically strong material for use as an absorbing and adsorbing agent prepared from a process including the steps of:
treating a combustible material having a low fuel content of equal to or less than about 50% carbon and selected from the group comprising coal schists, bituminous schists or clays mixed with a fuel such as coal, coal slurry, wood, or organic residues from domestic or other refuse, by pyrolysis at a first temperature between about 350° to about 900° C. for at least two hours under a slightly reduced pressure in a reducing atmosphere wherein gaseous by-products are produced during said pyrolysis treatment;
subsequently sintering said combustible material at a second temperature, said second temperature being higher than said first temperature to produce an absorbing and adsorbing product, said product having no more than trace amounts of carbon therein;
recovering at least a portion of said gaseous by-products; and
using said recovered by-products to provide continued energy to effect said pyrolysis treatment or to provide energy for at least another different activity.

14. The material of claim 13 wherein said combustible material is a coal slurry having the following composition (on a dry basis):
(a) fuel content (on a dry basis) of from about 10 to about 50%;
(b) calcined residue (on a dry basis) of from about 90 to about 50%; and
(c) moisture of from about 15 to about 60%.

15. The material of claim 13 including the step of:
adding an additive material to said combustible material in the proportion of 65% to about 80% by weight (on a dry basis), said additive material being selected form the group comprising clay, fly-ash, ash, calcination residues, distillation residues, lime, calcium or magnesium or another carbonate material, or magnesia, either alone or in combination with one of the other additive materials.

16. The material of claim 13 including the step of:
shaping said combustible material prior to said pyrolysis treatment.

17. The material of claim 16 wherein said shaping step includes:
shaping said combustible material so that no internal point in the shaped material is more than about 8 millimeters from the surface thereof.

18. The material of claim 16 wherein said shaping step comprises:
extruding said combustible material.

19. The material of claim 16 including the step of:
chopping said shaped combustible material.

20. The material of claim 13 wherein said second temperature is above 900° C.

21. The material of claim 13 including the further step of:
adding fluxes to said combustible material whereby the sintering second temperature may be reduced.

22. The material of claim 21 wherein:
said fluxes are added in the proportion of about 7% to about 15% by weight (on a dry basis) to said combustible material.

23. The material of claim 13 and including the further steps of:
recovering the latent heat of said gaseous by-products; and
recovering the latent heat of said absorbing and adsorbing product.

24. The material of claim 13 including the step of:
providing an oxidizing atmosphere subsequent to said pyrolysis whereby said absorbing or adsorbing product has a rosy or a red color.

* * * * *